(12) United States Patent
Hillyer et al.

(10) Patent No.: US 6,282,607 B1
(45) Date of Patent: Aug. 28, 2001

(54) EFFICIENT SCHEDULING OF READING DATA FROM MULTIPLE STORAGE MEDIUMS TO SATISFY MULTIPLE REQUESTS

(75) Inventors: Bruce K. Hillyer, Lebanon; Rajeev Rastogi, New Providence; Abraham Silberschatz, Summit, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/936,495

(22) Filed: Sep. 18, 1997

(51) Int. Cl.[7] .................................................. G06F 12/00

(52) U.S. Cl. ........................................... 711/111; 711/158

(58) Field of Search ............................... 711/4, 111, 112, 711/151, 158; 369/30, 84

(56) References Cited

U.S. PATENT DOCUMENTS

| | | | |
|---|---|---|---|
| 5,287,459 | * 2/1994 | Gniewek | 369/30 |
| 5,386,516 | * 1/1995 | Monahan et al. | 369/30 |
| 5,469,560 | * 11/1995 | Beglin | 711/112 |
| 5,546,557 | * 8/1996 | Allen et al. | 711/111 |
| 5,787,482 | * 7/1998 | Chen et al. | 711/158 |
| 5,845,316 | * 12/1998 | Hillyer et al. | 711/111 |

OTHER PUBLICATIONS

Ann Louise Chervenak, Tertiary Storage: An Evaluation of New Applications. Ph.D. dissertation, University of California at Berkeley, Computer Science Department, Dec. 1994.
Tzi–cker Chiuh. Performance optimization for parallel tape arrays. (Published In Proceedings of the 1995 International Conference on Supercomputing, pp. 385–394, Barcelona, Spain, Jul. 3–7, 1995. ACM Press).
Frank Davis, William Farrell, Jim Gray, Roberto Mechoso, Reagan Moore, Stephanie Sides, and Michael Stonebraker EOSDIS alternative architecture. Technical Report Sequoia 2000 TR 95/61, Univ. of California at Berkeley, Apr. 1995.
Leana Golubchik, Richard R. Muntz, and Richard W. Watson. Analysis of striping techniques in robotic storage libraries. (Published In Proceedings of the Fourteenth IEEE Symposium on Mass Storage Systems, pp. 225–238, Monterey, CA, Sep. 11–14, 1995. IEEE Computer Society Press.)
Jim Gray. Superservers: Commodity Computer Cluster Pose a Software Challenge. http://www.research.microsoft.com/research/BARC/Gray/SuperServers.doc, 1994.
Bruce K. Hillyer and Avi Silberschatz Random I/O scheduling in online tertiary storage systems. In Proceedings of the 1996 ACM Sigmod International Conference on Management of Data, pp. 195–204, Montreal, Canada, Jun. 3–6, 1996.
Randy H. Katz, Thomas E. Anderson, John K. Ousterhout, and David A. Patterson. Robo–line Storage: Low Latency, High Capacity Storage Systems over Georgraphically Distributed Networks. Report No. UCB/CSD 91/651, Computer Science Division (EECS), University of California, Berkeley, Sep. 1991.

(List continued on next page.)

*Primary Examiner*—Do Hyun Yoo
*Assistant Examiner*—Gary J. Portka
(74) *Attorney, Agent, or Firm*—Synnestvedt & Lechner LLP (57) ABSTRACT

A dynamic process for improving the performance of a tape-based storage system is disclosed which takes a global view with regard to scheduling and tape selection. All requested data blocks located on multiple tapes within the storage system are analyzed and, taking advantage of the existing replication of some of the requested data blocks on multiple tapes and the location of the data blocks on the tapes, a schedule is formed that results in the reading/downloading of requested data blocks in an efficient manner.

15 Claims, 7 Drawing Sheets

OTHER PUBLICATIONS

Jussi Myllymaki and Miron Livny. Disk–tape joins: Synchronzing Disk and Tape Access. )Published In Proceedings of the 1995 ACM Sigmetrics Conference on Measurement and Modeling of Computer Systems, pp. 279–290, Ottawa, Canada, May 15–19, 1995. ACM Press.)

Chris Ruemmler and John Wilkes, Disk shuffling. Technical Report HPL–CSP–91–30, Hewlett–Packard Laboratories, Palo Alto, CA, Oct. 3, 1991.

Sunita Sarawagi. Query Proecessing in tertiary memory databases. In Proceedings of the 21st International Conference on Very Large Databases, pp. 585–596, Zurich, Switzerland, Sep. 11–15, 1995. Morgan Kaufmann, San Francisco.

Sunita Sarawagi and Michael Stonebraker. Reordering query execution in tertiary memory databases. (Published In Proceedings of the 22nd International Confernce on Very Large Databases, pp. 156–167, Bombay, India, Sep. 1996. Morgan Kaufmann, San Francisco.)

JieBing Yu and David J. DeWitt. Query pre–execution and batching in paradise: A Two–Pronged Approach to the Efficient Processing of Queries on Tape–Resident Data Sets. Technical Report, University of Wisconsin, Madison, Mar. 1996.

* cited by examiner

EFFICIENT SCHEDULING OF READING DATA FROM MULTIPLE STORAGE MEDIUMS TO SATISFY MULTIPLE REQUESTS

FIELD OF INVENTION

The present invention relates generally to the field of data storage systems. More specifically, the invention relates to tape-based tertiary storage systems.

BACKGROUND OF THE INVENTION

A growing number of database applications require on-line access to large volumes of data. For example, telecommunication service providers store large amounts of phone call data to satisfy the requirements of billing, call statistics, and fraud detection. This information is accessed regularly by telecommunication providers. Other examples of users of on-line data access include digital libraries and video-on-demand servers.

Despite the rapid decline in magnetic disk prices, tape storage systems continue to be far more economical than disk storage systems (disk arrays) for storing large amounts of data. A tape-based tertiary storage system is the usual solution for a very large-scale storage system, which would otherwise require a large and impractical number of disk drives to contain the entire database. Tape-based systems are also cost-efficient and provide a wide variety of speed rates.

Even though tape-based systems have many advantages, a major disadvantage of tape systems compared to disk arrays is the high access delay, known as latency, for random retrievals. A typical tertiary storage system is made of several tape drives accessing a large pool of tapes. In high-end mass storage systems this usually takes the form of large "tape silos" that contain several drives and thousands of tapes. Robotic arms locate requested tapes and insert and remove tape from drives as needed. This tape-switching operation consumes a significant amount of time. The switching and positioning time in a randomly accessed tape-based system is measured in tens of seconds or minutes.

In addition to the latency resulting from the tape switching operation, locating and reading the information stored on tapes also consumes time.

Various scheduling processes have been developed to handle incoming data-block requests in an efficient manner. A conventional scheduling process is implemented by the combination of a major rescheduler, which chooses a tape and forms a retrieval schedule (service list) for the selected tape, and an incremental scheduler, which handles requests arriving after the formation of the retrieval schedule by the major rescheduler. The incremental scheduler either schedules the newly arriving requests at the instant they arrive, or defers them to a "pending list" until the next invocation of the major rescheduler. In a typical scheduling process, all the incoming requests that have not been scheduled are sent to the pending list. Next, a desired tape is selected and a retrieval schedule is formed by selecting requests from the pending list that are located on the selected tape. Conventional methods select tapes in an order, starting with the tape after currently mounted tape and then moving in a sequential order.

Three commonly used conventional scheduling processes are the null scheduling process, the static scheduling processes, the dynamic scheduling processes. A null scheduling process is based upon the "first in first out" principle which simply services requests in their order of arrival. This process gives reduced performance for random requests because the system may have to switch tapes many times to satisfy all of the requests, wasting valuable time. These multiple switches may include switches from a first tape to a second tape, and then back to the first tape, which is very inefficient.

The static scheduling processes freeze the service list once the major rescheduler has selected a tape and formed the service list. During the execution of the service list, newly arriving requests are appended to the pending list. Once the service list for the currently selected tape has been executed, then the requests remaining on the pending list are evaluated, a new tape is selected, and the process continues until all pending requests have been executed. This results in inefficient operation since during a sweep of the tape head, every newly arriving request is deferred to the pending list, even if the request is for a block that the tape head will pass over during the sweep.

Dynamic scheduling processes use a dynamic incremental scheduler that can insert a newly arriving request into the service list at the moment it arrives and takes advantage of forward (e.g., left-to-right) and reverse (e.g., right-to-left) locate phases of a locate operation. During the forward phase, any request for a data block on the currently loaded tape is executed. If the requested data block is at or beyond the position of the tape head (e.g., to the right of the tape head) at the time the request is received, it is placed into the forward locate phase of the service list and is read when the tape head reaches the data block. If the new request is for a data block on an area of the tape where the forward-moving tape head has already passed (e.g., to the left of the tape head), it is placed into the reverse phase of the service list and is read during the reverse phase. However, the tape head will not switch back to the forward phase to go back and read a newly-requested data block that it has already passed in the reverse locate phase. Such a request is deferred to a pending list.

All tape systems expend a significant amount of time in ejecting the old tape, putting away the old tape and retrieving a new tape, and loading the new tape into the drive. For example, in a system using an Exabyte EXB-8505 XL drive and an Exabyte EXB-210 tape library, this process can take 81 seconds.

Thus, there exists a need for a system which can decrease the access latency by minimizing the number of tape switches that need to be made and by globally monitoring all requests as they arrive, adjusting the schedule as needed, and optimizing the order in which the tapes are selected for reading.

SUMMARY OF INVENTION

The present invention is a dynamic process for improving the performance of a storage system and, in particular, a tape-based storage system, that takes a global view with regard to scheduling and tape selection. The speed of operation of the system is increased by analyzing all the requested data blocks located on multiple tapes within the storage system and, taking advantage of the existing replication of some of the requested data blocks on multiple tapes, forming a schedule that will read the requested data blocks efficiently from the multiple tapes.

In a preferred embodiment, first, a set of requests for a set of non-replicated data blocks is considered, and in particular, consideration is given to the requested non-replicated data blocks that are farthest from the beginning of each tape. The collection of these data blocks across all tapes defines a "primary envelope"—a set of data-block locations that must be traversed. This envelope may happen to contain some requested data blocks that are replicated at one or more locations on the tapes. Retrieving these data blocks does not require any additional portion of the tape to be traversed since they are located within the primary envelope. Then, to satisfy requests for data blocks that are not inside the primary envelope, the primary envelope is combined with an "upper envelope" that encompasses these requests. The combined areas of the primary envelope and upper envelope form an "extended envelope".

The current invention also proposes three new tape selection methods. Further, the inventive system may utilize improved processes for data placement and data replication. The data placement and replication method capitalizes on skewed data access patterns. As data access skews increase (i.e., as the distinction between frequently accessed and less-frequently accessed data increases), the performance improves when the present invention is implemented. By replicating "hot" (frequently requested) items onto multiple tapes, the number of tape switches may be reduced significantly which results in increased performance.

DETAILED DESCRIPTION OF THE INVENTION

Figure 1A:
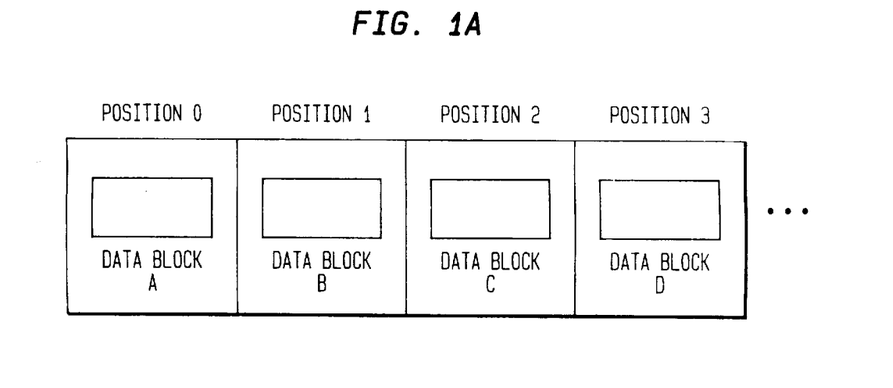
FIGS. 1A and 1B illustrate the arrangements of data blocks on a tape.
Figure 1B:
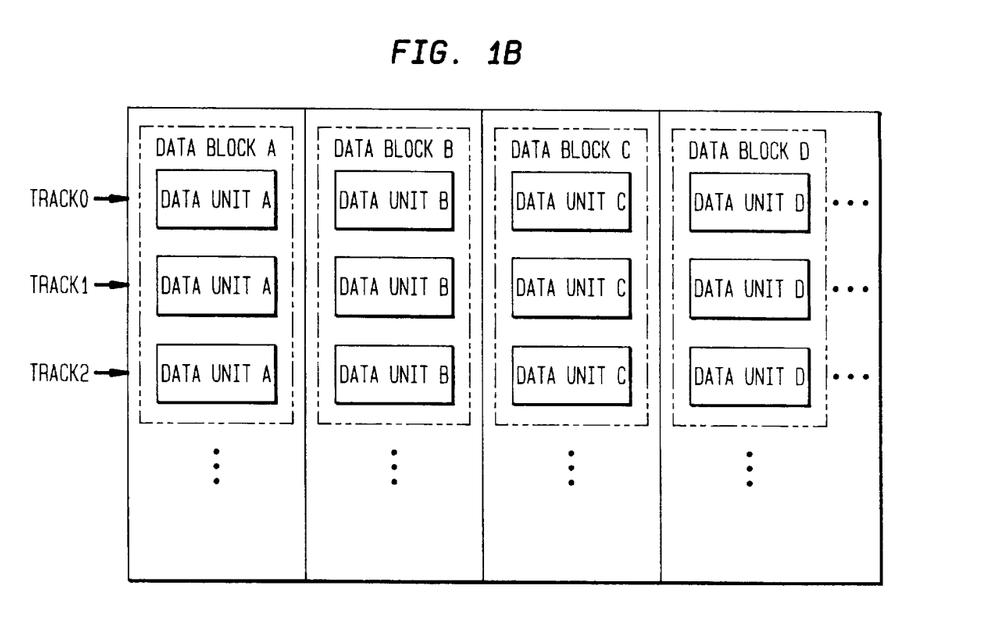

As shown in FIG. 1A, the unit of storage in a typical tape is a data block of fixed size (e.g., data block A, data block B, data block C, etc.). The data blocks may comprise a plurality of data units. For example in FIG. 1B, a tape contains units of data (data unit A, data unit B etc.) arranged on multiple tracks, e.g., TRACK 0, TRACK 1, TRACK 2, and so on. A data block on a multiple track tape represents a plurality of data units located on the various tracks. For either type of tape, (single track or multiple track) the tape moves sequentially i.e. the tape head moves from left-to-right or right-to-left, locating and reading data blocks along the way.

The information contained in a particular data block may be replicated in a data block on one or more other tapes within the system. Data blocks are stored on a tape in physical positions that are consecutively numbered starting from 0, i.e., the first data block on a tape is designated as being at position 0, the second data block on a tape is designated as being at position 1, and so on. In addition to the previously-discussed time costs associated with switching from one tape to another, there are also time costs associated with locating and reading data blocks. The locate operation repositions the tape head from one data block to another. The locate time is the amount of time it takes the tape head to move from its current position to the next requested data block. The read operation involves the reading of a data block after it has been located. The time needed to read a data block after it has been located is known as the read or transfer time.

Figure 2A:
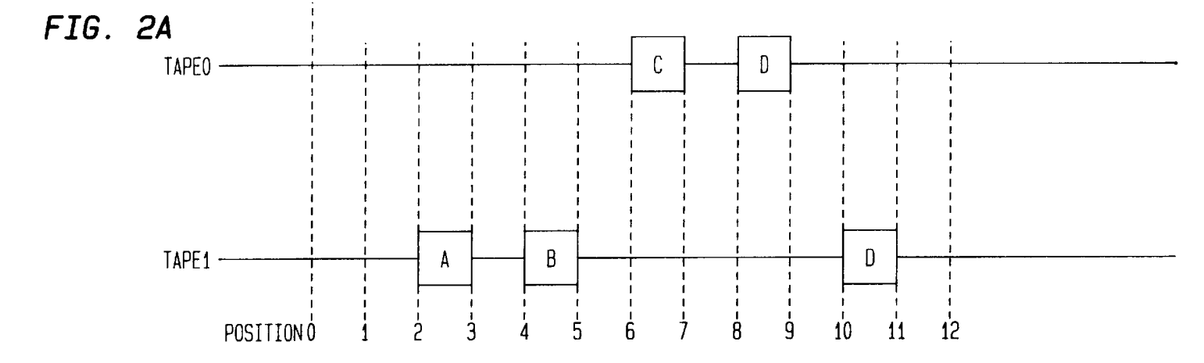
FIGS. 2A and 2B illustrate the basic principles of the present invention.

FIGS. 2A and 2B introduce the basic principle of the present invention. In FIG. 2A, for purpose of example, there are two tapes (Tape 0 and Tape 1) from which to read data blocks. In this example, presume that a request is made for data blocks A, B, C, and D, and that the current position of the tape head is at the beginning (position 0) of Tape 1. As can be seen, data block D is replicated on both Tape 0 and Tape 1. After reading data blocks A and B from Tape 1, the conventional method would have the tape head proceed to the end of Tape 1 to fetch data block D, then switch to Tape 0 and read data block C. A better choice, which is accomplished by the present invention as described below, is to retrieve the copy of data block D that follows data block C on Tape 0.

Figure 2B:
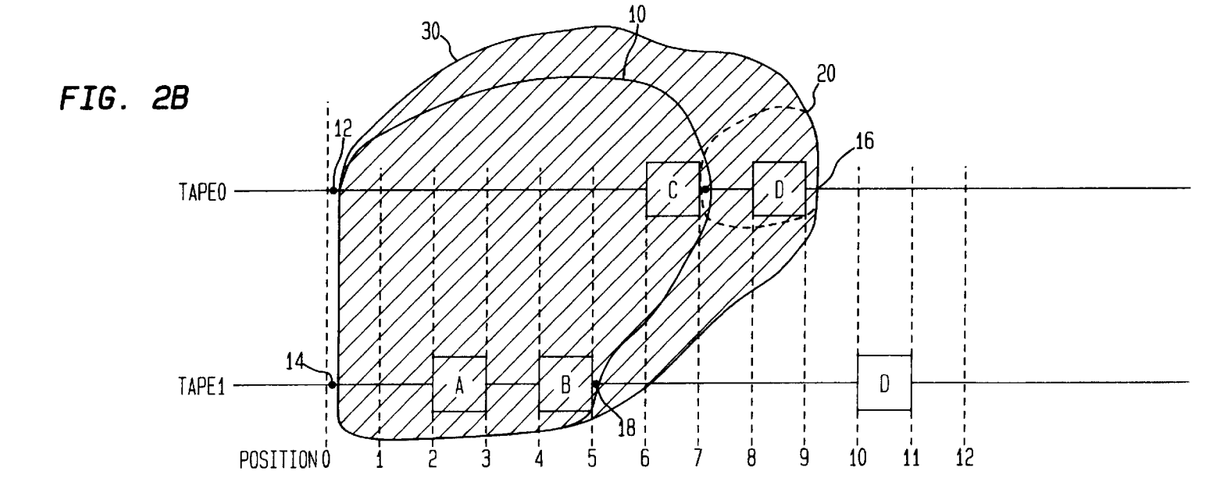

In accordance with the present invention, first the requested non-replicated data blocks that are farthest from the beginning of each tape (e.g., C on Tape 0 and B on Tape 1) are identified. The right edge of these data blocks across Tape 0 and Tape 1 define the outer boundaries of the primary envelope 10 as seen in FIG. 2B.

To satisfy requests that have no replicas inside the primary envelope 10 such as the request for data block D, the primary envelope 10 is incrementally extended to include an upper envelope 20 that satisfies all remaining requests. This forms an extended envelope 30 comprising the combination of primary envelope 10 and upper envelope 20. Accessing data block D from Tape 0 is less time consuming than accessing data block D from Tape 1, since a tapeswitch must be made to access data block C on Tape 0 anyway, and the distance from data block C to data block D on Tape 0 is shorter than the distance from data block B to data block D on Tape 1. Thus, the primary envelope 10 is extended from data block C to data block D on Tape 0. The extended envelope 30 is defined as having a first edge at 12 on Tape 0 and a first edge at 14 on Tape 1. The outer edge of envelope 30 lies at edge 16 on Tape 0 and at edge 18 on Tape 1.

Figure 3:
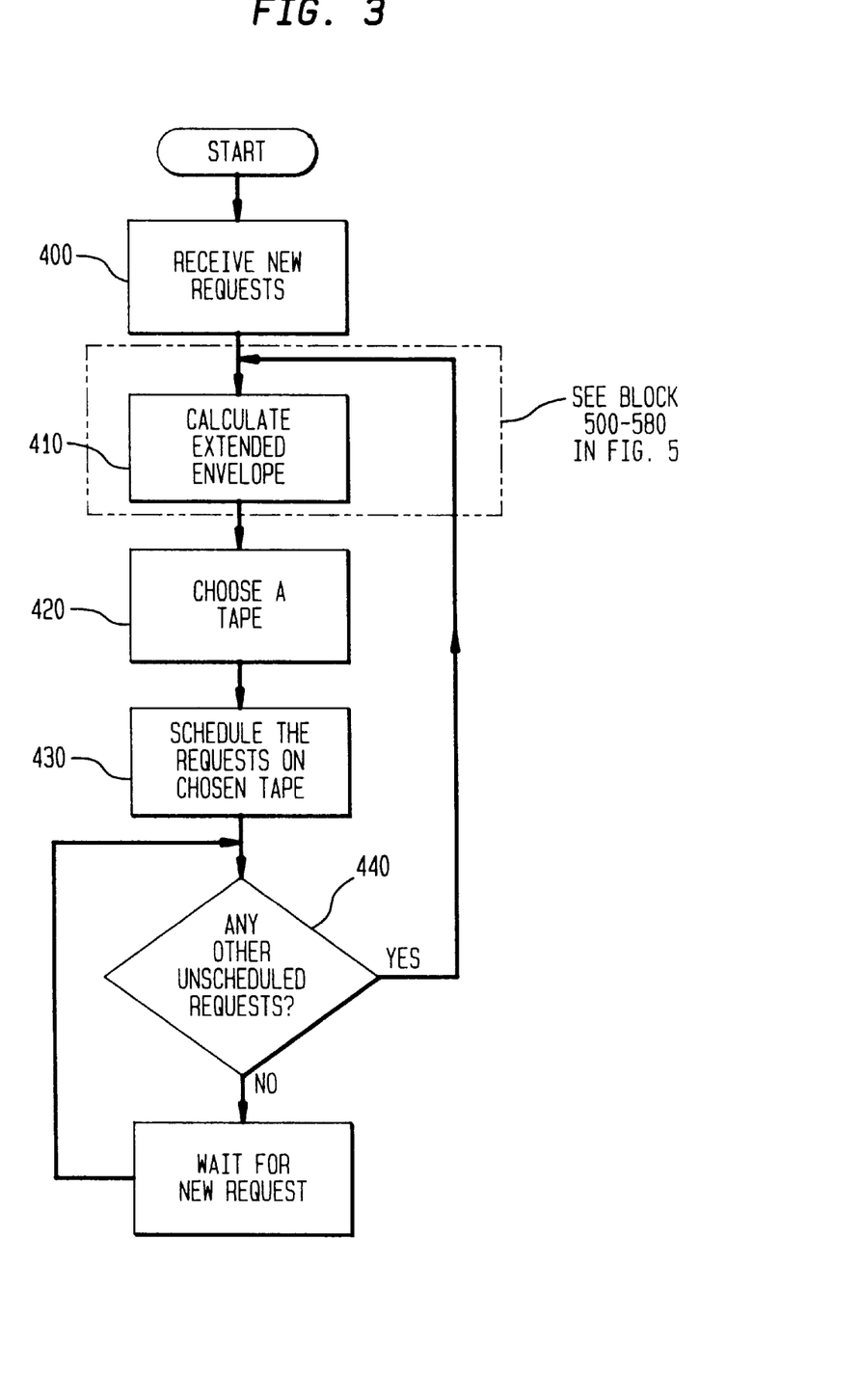
FIG. 3 illustrates the basic steps involved in the envelope-extension methodology.

FIG. 3 is a flow chart showing the basic steps involved in practicing the present invention. At block 410, an extended envelope is determined for all the requested data blocks in the pending list (the process of determining the extended envelope is described in detail below with respect to FIGS. 4A–4F and 5). Then a tape is selected according to one of the tape selection methods described below (block 420). Next, all requests that can be satisfied by the portion of the selected tape that lies within the extended envelope are scheduled (block 430) by developing a service list for the requested data blocks.

After completing the download schedule for the selected tape, the process checks to see if there are any unprocessed requests on the pending list. The steps of block 400–430 are repeated until all the requests for data blocks are satisfied.

FIGS. 4A–4F and FIG. 5 describe in detail, by way of example, the steps involved in defining the extended envelope 30. In FIGS. 4A–4F, assume that data blocks A through F have been requested. First, the primary envelope 10 is formed by identifying the unreplicated requested data blocks, namely A, B, and C (block 510 of FIG. 5). Thus, the outer edge of the primary envelope 10 is at position 4 on Tape 0 and position 2 on Tape 1. The first edge of primary envelope 10 is positioned at the beginning (position 0) of each tape that has requested data blocks contained thereon. Thus, requested data block D on Tape 0 is already inside the primary envelope 10. All other occurrences of data block D (e.g., data block D on Tape 1) are disregarded (block 520 of FIG. 5). The only remaining requested data blocks are data blocks E and F.

Figure 5:
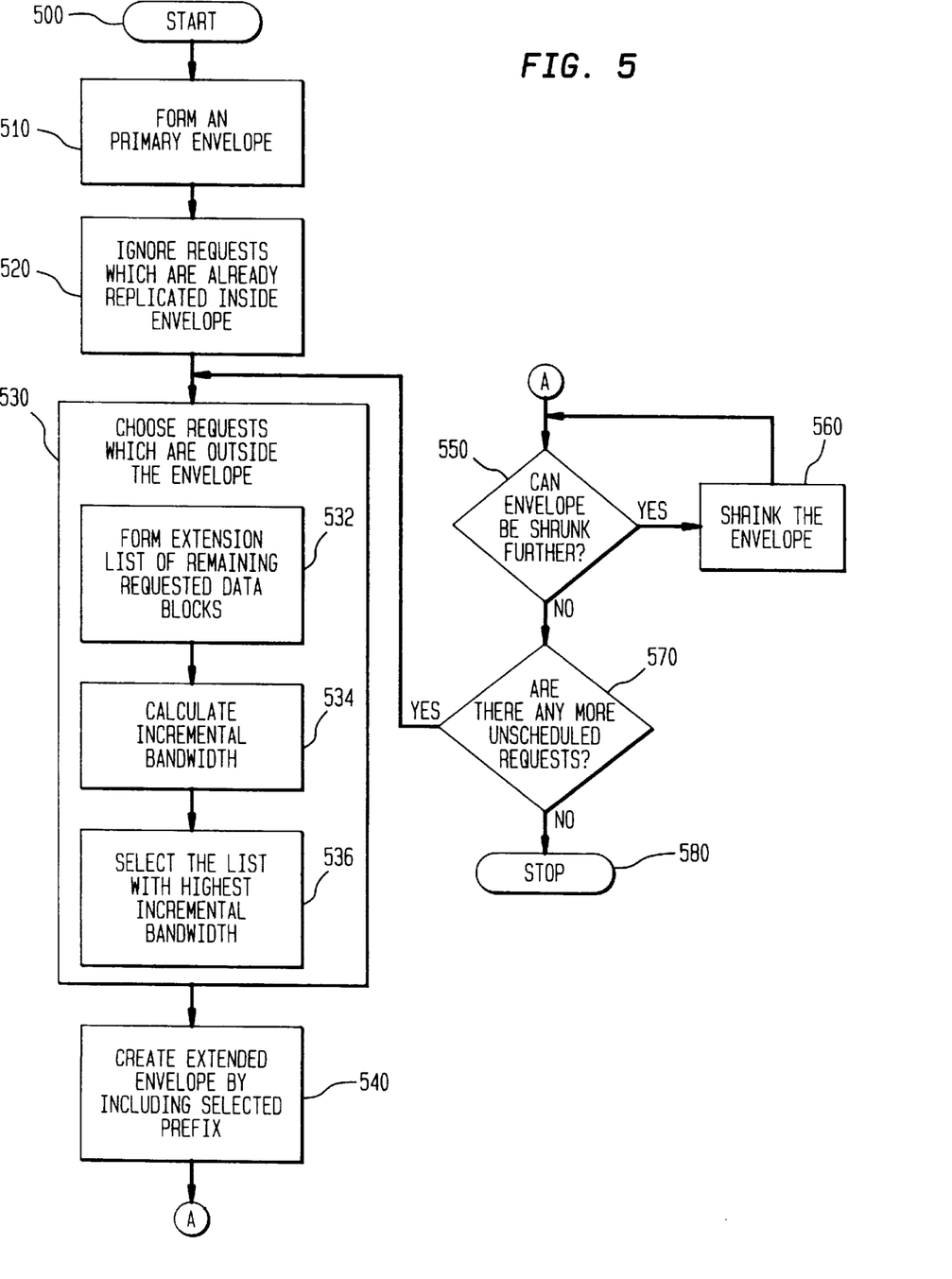
FIG. 5 illustrates the steps involved in determining the extended envelope.

The next step is to form extension lists for all the remaining requested data blocks (block 532 of FIG. 5). The extension lists are formed by considering the various combination of selections available for reading the remaining requested data blocks. In our example the four possible extension lists are (E) from Tape 0, or (E, F) from Tape 0, or (E) from Tape 1, or (E, F) from Tape 1. At this point, no extension list for data block F by itself is formed, since data block E will be traversed in reading data block F on either Tape.

Next, the "incremental bandwidth" associated with reading the extension lists is calculated (block 534 of FIG. 5). The incremental bandwidth is defined as the amount of data to be read divided by the time cost of locating and reading the data. Thus, it is more efficient to read a data block or a grouping of data blocks having a high bandwidth than to read those with a lower bandwidth. For this example, we assume for the sake of simplicity that the time cost of a read or locate step is equal to the number of positions traversed during the step. For Tape 0 the primary envelope edge is at position 4. The time cost for reading data block E is the time it takes to read 2 positions (read to position 5 from position 4 and rewind to position 4), so the incremental bandwidth of E on Tape 0 is b/2, where b represents number of bytes in a data block. The time cost for reading data block F on Tape 0 (which would include reading data block E) is 12 positions (read to position 5, locate to position 9, read to position 10, and rewind back to position 4). Thus, the incremental bandwidth of reading data blocks E and F for Tape 0 is 2b/12 (i.e., b/6).

For Tape 1 the outer envelope edge is at position 2. The time cost for reading data block E on Tape 1 is 6 positions (locate to position 4 from position 2, read to position 5, and rewind back to position 2). Therefore, the incremental bandwidth of reading data block E from Tape 1 is b/6. The time cost for reading data block F on Tape 1 (which would include reading data block E) is 8 positions (locate to position 4, read to position 6, and rewind back to position 2). Thus, the incremental bandwidth of reading data blocks E and F for Tape 1 is 2b/8=b/4.

The highest incremental bandwidth among these is b/2 for data block E on Tape 0 (block 536 of FIG. 5).

Since requested data block E on Tape 0 has the highest incremental bandwidth, the outside edge of requested data block E on Tape 0 (position 5) defines the outer edge of the upper envelope 20. This upper envelope 20 is added to the primary envelope by extending the primary envelope outer edge to position 5 on Tape 0 (see FIG. 4D) thereby forming an extended envelope 30 (block 540 of FIG. 5).

Since requested data block F has not yet been selected, it is addressed in a manner similar to that of requested data block E. The incremental bandwidth of data block F on Tape 0 is b/10, and the incremental bandwidth of requested data block F on Tape 1 is b/8. Since the incremental bandwidth of data block F is higher on Tape 1, the extended envelope is again extended, this time to position 6 of Tape 1 to include data block F. Now the outer edge of extended envelope 30 is at position 5 on Tape 0 and position 6 on Tape 1 (see FIG. 4E).

Figure 4A:
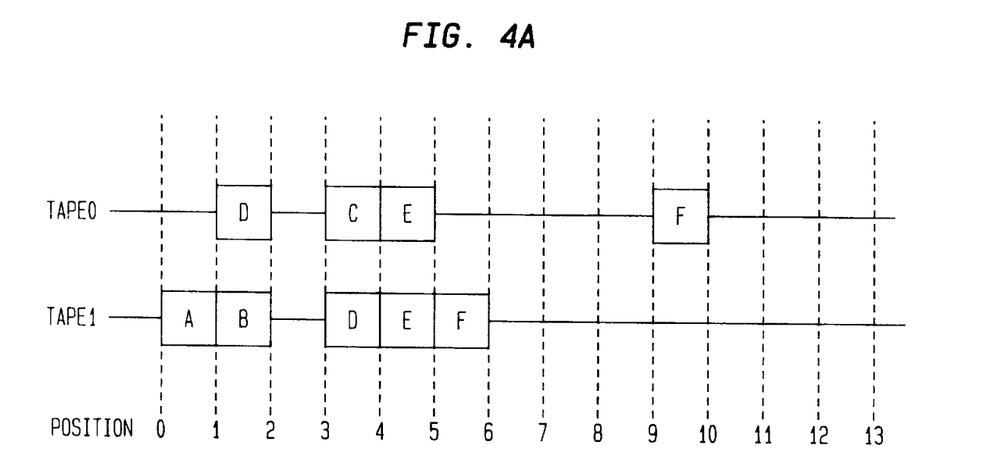
FIGS. 4A–4F illustrate the envelope-extension method in the form of an example.
Figure 4B:
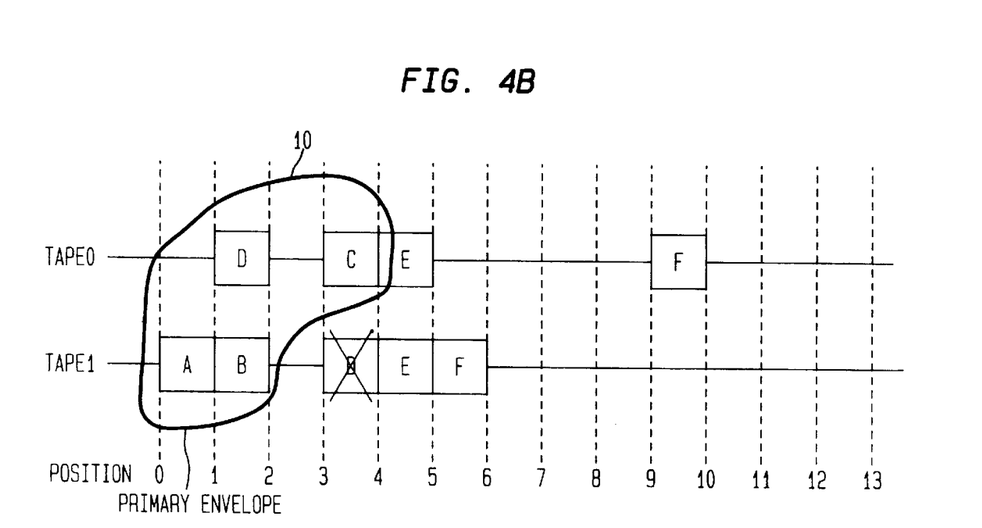
Figure 4C:
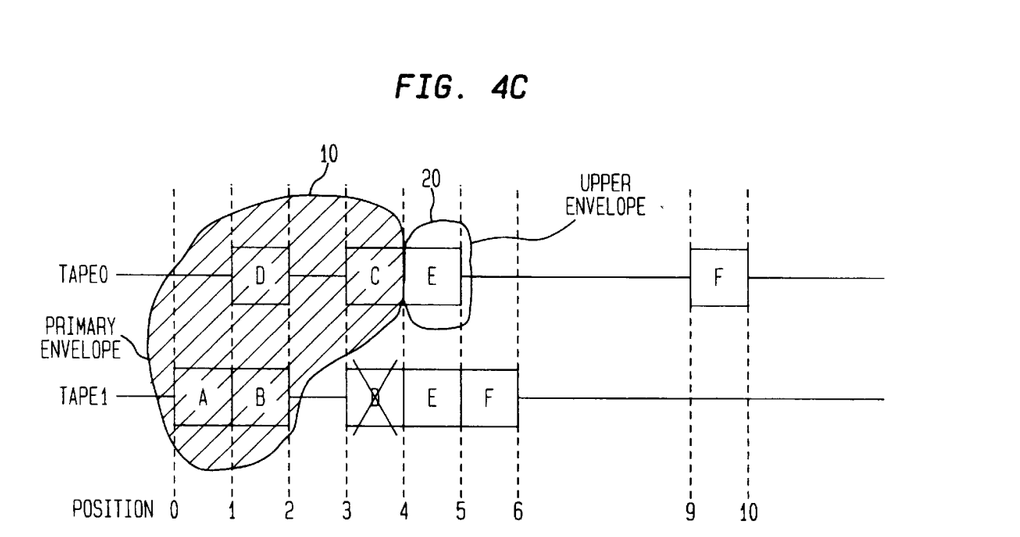
Figure 4D:
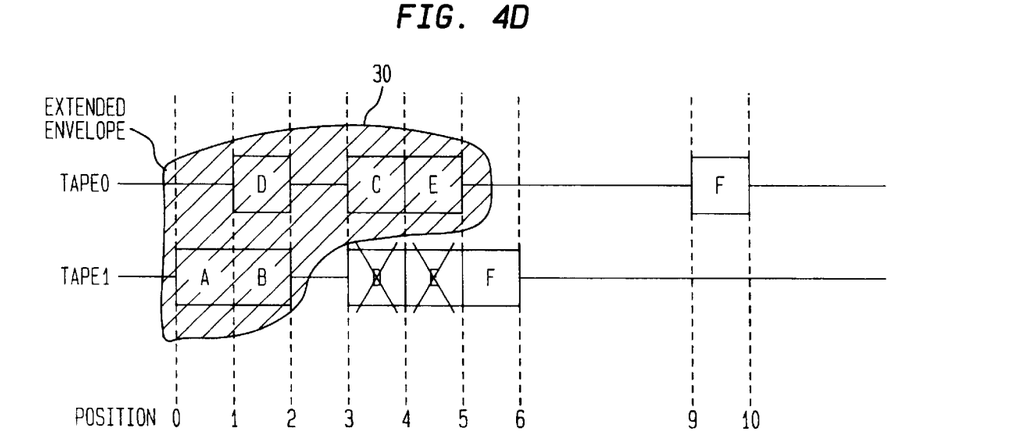
Figure 4E:
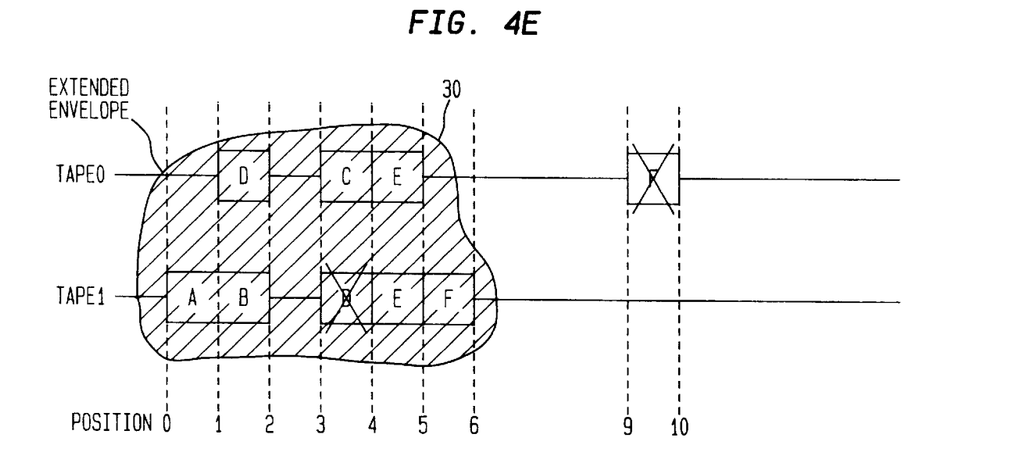
Figure 4F:
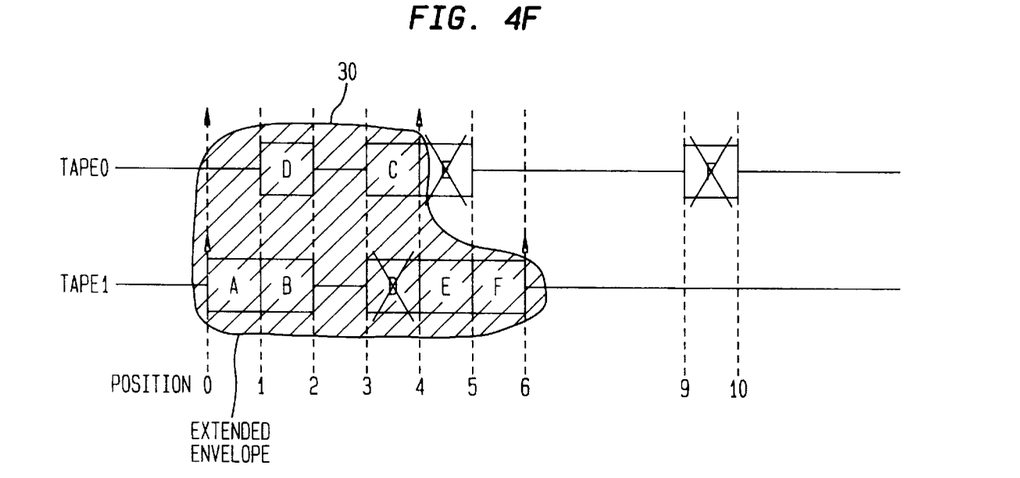

In the previous step, the envelope was extended to include the portion of Tape 1 from position 2 through position 6. As can be seen from FIG. 4E, there are now two occurrences of data block E within the extended envelope 30. Since data block E will be traversed on Tape 1 as the head moves to read data block F, the extended envelope of Tape 0 is reduced back to position 4 as shown in FIG. 4F and data block E is read from Tape 1 (block 560). Since all requests are now scheduled, the iterations terminate (block 580).

The next step is to choose which tape to select first using one of the following methods. In the instant example, Tape 1 has five requested data blocks inside the extended envelope (A, B, D, E, F) and Tape 0 has two requested data blocks inside the extended envelope (D and C). The "Maximum Requests" method identifies the tape having the maximum number of requested data blocks, and this tape is selected first. If more than one tape contains this maximum number of requested data blocks, this method chooses the tape appearing next in the tape system order. Thus, in the present example, if the Maximum Request method is used, Tape 1 will be selected first.

The "Maximum Bandwidth" method calculates the "effective bandwidth" (retrieval rate) of each tape with respect to all the requested data blocks. The effective bandwidth of a tape equals the total number of bytes to be retrieved from the tape divided by the time taken to perform the retrieval. The method then chooses the tape with the highest effective bandwidth. If more than one tape has this highest effective bandwidth, the method chooses the tape appearing next in the tape system order.

For the present example, under the Maximum Bandwidth method, the effective bandwidths associated with Tape 0 and Tape 1 are calculated first. For the purpose of the example, we assume that the time cost of the eject, switch and load process is equal to the time needed to read two data blocks. Further, assume that Tape 0 is currently loaded with the tape head at position 1. Thus, for Tape 0, the effective bandwidth of retrieving data block D and C is 2b (b equals the number of bytes in a data block) divided by a time cost of 3 positions (just to locate and read through the data; no rewind is required). In other words, the effective bandwidth is 2b/3.

For Tape 1, the effective bandwidth of retrieving data blocks A, B, D, E, and F, including the rewind and tape switch, is 5b/9 i.e., 5b bytes divided by a time cost of 9 positions (rewind from position 1 to position 0 of Tape 0 ; switch from Tape 0 to Tape 1 ; read from position 0 to position 2 ; locate to position 4 ; read to position 6). Since Tape 0 has a higher effective bandwidth, under the Maximum Bandwidth method, data blocks D and C from Tape 0 are scheduled for retrieval first.

Under the "Oldest Request" tape selection method, the first request on the pending list is identified first. The first request is the oldest request in the system because the pending list is built by appending requests as they arrive. In our example, if we assume "A" is the oldest request, Tape 1 would be selected first, and after the requested data blocks contained within the extended envelope and Tape 1 have been read, Tape 0 will be selected (assuming that no new requests have arrived which would affect the schedule). If replicas of the oldest requested data block exist on more than one tape, the method chooses between the several tapes either by combining the Oldest Request and Maximum Request method or by combining the Oldest Request and Maximum Bandwidth methods. The extended envelope may be used with any of the tape selection methods and it is left up to the user to select the method depending on system requirements and user needs.

After the download from the selected tape is complete, the steps of block 500-580 are repeated before another tape is selected.

As obvious from the above example, the inventive envelope-extension method improves the performance of a tape-based storage system by handling the request-stream efficiently. Download requests are constantly revaluated to determine which data blocks and which tape should be selected for processing. The method of the present invention can be practiced with a computer and software which programs the computer to perform the various functions/steps described in detail above. A computer so configured provides means for carrying out these functions/steps.

The system performance may be further improved by managing data placement and data replication schemes. Most data storage systems have some data blocks that are "hotter" (e.g., data blocks that are repeatedly requested) than others, giving rise to a non-uniform request-stream. For example, video access patterns in a video server environment are similar to rentals at video rental stores in which 60% of rentals are found to be for movies released in the last four months.

This non-uniform request stream may be utilized to increase the efficiency and speed of the system. One method is to place copies of hot data blocks on more than one tape. Placing copies of hot data blocks on more than one tape increases the number of data blocks that may be retrieved from any given tape, thus reducing the frequency of tape switching, and decreasing the average locate time between data blocks retrieved from a particular tape. If the hot data blocks are replicated on various tapes, it is preferable to store the hot data blocks at the end of each tape. This is a cost-effective method as one may choose to periodically update the hot data and append the new hot data to various tapes. By designating the end of each tape as the "hot data area", the hot data area may be overwritten on a regular basis to assure that the hot data is still "hot".

If tape space is limited, and it is therefore impractical or impossible to replicate the hot data on several tapes, frequently accessed data blocks should be located at the beginning of the tape on which they reside. This will assure that the frequently accessed data will be quickly retrievable.

While there has been described herein the principles of the invention, it is to be understood by those skilled in the art that this description is made only by way of example and not as a limitation to the scope of the invention. For example, the inventive system and process may be used by any other technology which requires sequential access to multiple data units. Accordingly, it is intended by the appending claims, to cover all modifications of the invention which fall within the true spirit and scope of the invention.

We claim:

1. A method for use in a data storage system comprising the steps of:
   receiving requests for accessing a plurality of data blocks, each of the requested data blocks being located at a respective position on at least one of a plurality of storage mediums;
   identifying, for a selected one of said storage mediums, a first portion of said requested data blocks, said first portion including a first group of ones of said requested data blocks that exist only on said selected storage medium and a second group of ones of said requested data blocks that must be traversed in order to access the data blocks in the first group;
   identifying, for said selected one of said storage mediums, a second portion of said requested data blocks, said second portion including ones of said requested data blocks that also exist on at least one storage medium other than said selected storage medium and that the accessing of which would meet a predetermined criterion; and
   creating a schedule for accessing ones of said requested data blocks which are stored on said selected storage medium and which are included in said first or second portions.

2. The method of claim 1, wherein said method further comprises:
   repeating said first and second identifying steps and said step of creating a schedule until access to all said requested data blocks is scheduled.

3. The method of claim 1, wherein, in the second identifying step, only those ones of said requested data blocks that are not replicates of data blocks in the first portion are included in said second portion.

4. The method of claim 1, wherein said predetermined criterion is selected from a group consisting of information relating to the amount of data to be accessed in each said requested data block, information relating to time to locate said requested data block, and information relating to time to read said requested data block.

5. The method of claim 1, wherein said second group of said first portion includes ones of said requested data blocks being located on said selected storage medium between the beginning of said selected storage medium and the location of a data block that is included in said first group of said first group.

6. A method for improving the performance of a tape storage system that processes data-block requests, said system comprising a tape head, a plurality of storage tapes, and a plurality of data blocks each stored on at least one of said storage tapes at a particular position thereon, said method comprising the following steps:
   determining every position of each requested data block of each data-block request on said storage tapes relative to the beginning of said storage tapes;
   determining if any of said data blocks are replicated on multiple storage tapes;
   forming a primary envelope comprising requested data blocks that are not replicated on multiple storage tapes;
   forming an extended envelope by expanding said primary envelope to include requested data blocks that are replicated on multiple storage tapes; and
   selecting one of said storage tapes and creating a schedule for said requested data blocks which are stored on said storage tape and are inside said extended envelope.

7. The method of claim 6, wherein said method further comprises:
   repeating all the steps in sequence until all data-block requests are scheduled.

8. The method of claim 6, wherein said primary envelope has a first edge and wherein said step of forming said primary envelope includes the step of:
   including in said primary envelope any requested data blocks which are located between the beginning of said storage tape and said first edge.

9. The method of claim 8, wherein said step of forming said primary envelope further comprises the step of:
   eliminating for consideration any requested data blocks that are located outside said primary envelope and that are replicates of data blocks located inside said primary envelope.

10. The method of claim 6, wherein said step of forming an extended envelope comprises the steps of:
    forming, for each tape, extension lists for requested data blocks which are outside said primary envelope;
    calculating an incremental bandwidth associated with the retrieval of each said extension list;

selecting the one of extension lists having the highest incremental bandwidth; and extending said primary envelope to include therein the data blocks associated with said selected extension list.

11. The method of claim 6, wherein said step of selecting a storage tape comprises the steps of:

calculating the number of requested data blocks located on each said storage tape; and selecting the storage tape with the most number of requested data blocks located on it.

12. The method of claim 6, wherein said step of selecting a storage tape comprises the steps of:

calculating the retrieval rate associated with each said storage tape which is inside said extended envelope;

selecting the storage tape with the highest retrieval rate; and scheduling the processing of said requested data blocks which are stored on said selected storage tape and which are inside said extended envelope.

13. The method of claim 6, wherein said step of selecting a storage tape comprises the steps of:

determining the oldest request among said requested data blocks; and selecting the storage tape having said oldest request located thereon.

14. The method of claim 6, wherein said method further comprises:

replicating repeatedly requested data blocks on more than one of said storage tapes.

15. The method of claim 14, wherein said method further comprises:

placing said replications of repeatedly requested data blocks at the end of said storage tapes.

* * * * *